(12) United States Patent
Bubel et al.

(10) Patent No.: US 7,831,114 B2
(45) Date of Patent: Nov. 9, 2010

(54) TUNABLE DISPERSION COMPENSATOR WITH MINIMUM DIFFERENTIAL GROUP DELAY

(75) Inventors: Gregory M. Bubel, Middletown, NJ (US); William R. Holland, Upper Black Eddy, PA (US); David J. Kudelko, Rockaway, NJ (US); Yaowen Li, Princeton, NJ (US); Paul S. Westbrook, Bridgewater, NJ (US)

(73) Assignee: OFS Fitel LLC, Norcross, GA (US)

( * ) Notice: Subject to any disclaimer, the term of this patent is extended or adjusted under 35 U.S.C. 154(b) by 0 days.

(21) Appl. No.: 12/351,843

(22) Filed: Jan. 11, 2009

(65) Prior Publication Data

US 2009/0185771 A1    Jul. 23, 2009

Related U.S. Application Data

(60) Provisional application No. 61/021,769, filed on Jan. 17, 2008.

(51) Int. Cl.
*G02B 6/00* (2006.01)
*G02B 6/34* (2006.01)

(52) U.S. Cl. ............. 385/11; 385/24; 385/37; 398/81; 398/84; 398/147

(58) Field of Classification Search ............. 385/11, 385/24, 37; 398/43, 65, 81, 84, 140, 147, 398/148, 152, 158–161, 192
See application file for complete search history.

(56) References Cited

U.S. PATENT DOCUMENTS

| 5,701,188 | A  | * | 12/1997 | Shigematsu et al. | ......... 398/148 |
| 6,137,924 | A  |   | 10/2000 | Strasser et al. | |
| 6,400,869 | B2 | * | 6/2002  | Pan et al. | ...................... 385/37 |
| 6,590,684 | B1 | * | 7/2003  | Goodfellow | ................ 398/149 |
| 2002/0159699 | A1 | | 10/2002 | Kohnke et al. | |
| 2003/0161568 | A1 | | 8/2003  | El-Refaei et al. | |
| 2004/0208620 | A1 | | 10/2004 | Berger et al. | |

OTHER PUBLICATIONS

European Patent Office, Search Report, Mar. 11, 2009, Munich, DE.
Eggleton et al., "Integrated Tunable Fiber Gratings for Dispersion Management in High-Bit Rate Systems," Journal of Lightwave Technology, Oct. 2000, vol. 18, No. 10, pp. 1418-1432.

* cited by examiner

*Primary Examiner*—Daniel Petkovsek
(74) *Attorney, Agent, or Firm*—Jacobs & Kim LLP; Daniel Kim, Esq.

(57) ABSTRACT

In a method and system for providing dispersion compensation in an optical system, there is coupled into the optical system at least one pathway into which there is connected a tunable chirped fiber Bragg grating, each such grating providing a respective tunable amount of dispersion. At least one respective DGD element is connected into the respective pathway for each such grating. The set of all such respective DGD elements in a given pathway introduces a bias differential group delay $DGD_{(bias)}$ having an absolute value that, for at least one tuning value of the grating, is substantially equal to differential group delay introduced by the grating.

12 Claims, 8 Drawing Sheets

TUNABLE DISPERSION COMPENSATOR WITH MINIMUM DIFFERENTIAL GROUP DELAY

CROSS-REFERENCE TO RELATED APPLICATIONS

This application for patent claims the priority benefit of U.S. Provisional Patent Application Ser. No. 61/021,769, filed Jan. 17, 2008.

BACKGROUND OF THE INVENTION

1. Field of the Invention

The present invention relates generally to optical fiber devices and methods, and in particular to improved systems and methods for providing tunable dispersion compensation in an optical transmission link with minimum differential group delay.

2. Description of Prior Art

An ongoing issue in the development of optical fiber transmission systems is chromatic dispersion. An optical fiber introduces a certain amount of wavelength-dependent time delay into transmitted data. The steepness of the slope of the wavelength-dependence function increases with the length of the transmission line. In today's optical fiber transmission systems, it is possible for an optical fiber to be used to transmit data at different wavelengths over a distance of hundreds, or even thousands, of kilometers. Without suitable dispersion compensation, chromatic dispersion may lead to an unacceptably large difference in arrival times of signals having different wavelengths.

A dispersion compensator addresses the problem of dispersion by introducing offsetting wavelength-dependent delays into the optical transmission link, thus reducing the difference in arrival times to an acceptably small level. One optical device that can be used to provide dispersion compensation is a chirped fiber Bragg grating (CFBG). See, e.g., Eggleton et al., "Integrated Tunable Fiber Gratings for Dispersion Management in High-Bit Rate Systems," *Journal of Lightwave Technology*, vol. 18, 1418 et seq. (2000).

A Bragg grating is formed by using a high-intensity ultraviolet light source to "write" a periodic series of changes into the refractive index of a segment of optical fiber. Through the use of a particular writing scheme, it is possible to create a series of refractively modified regions, each of which functions as a wavelength-specific dielectric mirror that reflects light at a particular wavelength back down the length of the fiber segment, while allowing light at other wavelengths to pass through. A "chirped" fiber Bragg grating (CFBG) may be used as a dispersion compensator. In a CFBG, the wavelength reflectivity and spacing of the refractively modified regions are chosen to introduce a negative dispersion in an optical data signal, thereby substantially reducing or eliminating differences in arrival times caused by chromatic dispersion.

A CFBG typically exhibits a certain amount of birefringence. Because of this birefringence, the optical response from a CFBG will exhibit a certain amount of polarization mode dispersion (PMD). The presence of PMD in an optical transmission link will introduce a polarization-dependent delay, causing signals having different polarizations to arrive at different times at the destination point. As used herein, the term "polarization mode dispersion" (or "PMD") refers to the physical phenomenon that causes the difference in arrival times. The quantification of this phenomenon is referred to herein as "differential group delay" (or "DGD").

In the simplest case of a grating with dispersion D and birefringence B operating at a given wavelength $\lambda$ (e.g., 1550 nm), the grating will exhibit first-order PMD, which is characterized by a single value of differential group delay (DGD) between the two principal states of polarization (PSPs) with a value that can be expressed as follows:

$$DGD = BD\lambda \qquad (1)$$

It is known that the DGD for a given CFBG can be reduced by connecting thereto an element that introduces a fixed amount of oppositely signed DGD into the transmission link. See, e.g., U.S. Pat. No. 6,137,924 to Strasser et al. (hereinafter referred to as "the '924 patent"), which discloses a technique for eliminating DGD by adding into an optical path to a static CFBG a segment of polarization-maintaining fiber (PMF). The amount of DGD introduced by the PMF segment varies with its length.

Further known in the art is a CFBG that is tunable over a range of dispersion values. Tuning is accomplished in a number of ways including, for example, applying to the CFBG a thermal or strain component, the gradient of which can be precisely controlled. Moreover, it is known to concatenate two or more CFBGs to achieve a larger or more symmetric tuning range.

Current techniques, such as those disclosed in the '924 patent, are directed to the use of a fixed DGD element in conjunction with a static (i.e., non-tunable) CFBG. While these techniques are attractive because of their simplicity, it is not known how to apply them to a dispersion compensator having one or more tunable gratings. In a tunable CFBG, DGD varies as a function of the tuned dispersion. Thus, where a fixed DGD element is used to provide PMD compensation in conjunction with a tunable grating, it will be appreciated that the fixed DGD element can at best only minimize the DGD for one particular setting of a tunable CFBG. Some DGD will always result at other settings. As a result, there exists a need for a means of achieving the minimum value of DGD in a CFBG over its entire tuning range.

A further issue arises where two or more gratings are concatenated. In that case, there are many tuning voltages that will yield the same value for total dispersion. Thus, an effective DGD minimization technique must allow for different tuning trajectories. Also, a particular tuning trajectory may be dictated, for example, by considerations of power consumption, or the like In this case, a means of constructing the device in order to achieve minimum DGD along a given tuning trajectory is needed.

SUMMARY OF THE INVENTION

These and other issues of the prior art are addressed by the present invention, one aspect of which provides a method and system for providing dispersion compensation in an optical system. There is coupled into the optical system at least one pathway into which there is connected a tunable chirped fiber Bragg grating, each such grating providing a respective tunable amount of dispersion. At least one respective DGD element is connected into the respective pathway for each such grating. The set of all such respective DGD elements in a given pathway introduces a bias differential group delay $DGD_{(bias)}$ having an absolute value that, for at least one tuning value of the grating, is substantially equal to the differential group delay introduced by the grating.

Further described aspects of the invention are directed to methods and systems for providing tunable dispersion compensation in an optical link, in which there are coupled into the link a plurality of gratings, DGD elements, and respective pathways thereto.

Additional features and advantages of the present invention will become apparent by reference to the following detailed description and accompanying drawings.

DETAILED DESCRIPTION

The above issues and others are addressed by the present invention, aspects of which are directed to systems and methods or using a tunable chirped fiber Bragg grating and a DGD element to provide dispersion compensation with minimum DGD over the entire operating range of the tunable grating.

The present invention is described with respect to a number of different examples set forth below and in the accompanying drawings. It will be appreciated that the present examples are illustrative, rather than limiting, and that the invention, as claimed herein, may be practiced with respect to modifications of the described examples, as well as with respect to structures not specifically described herein.

Figure 1:
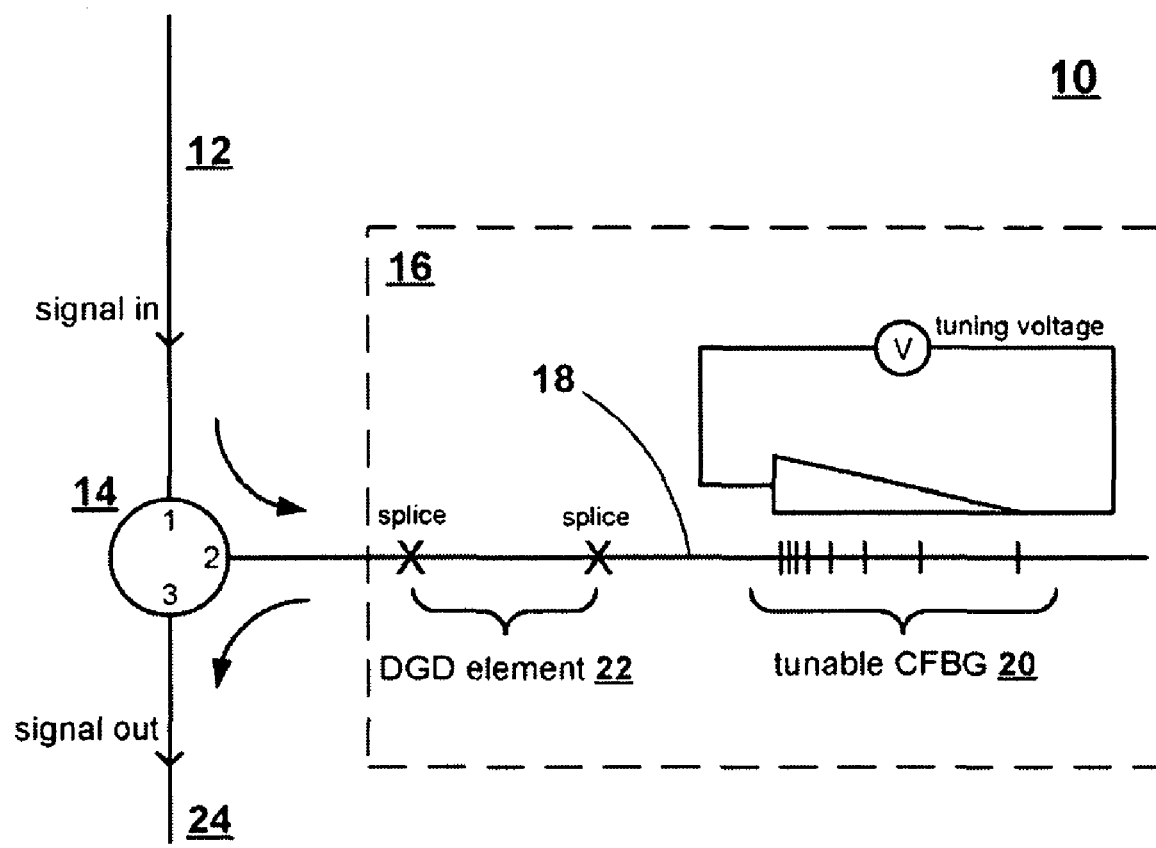
FIG. 1 is a diagram of a tunable dispersion compensator with minimum DGD according to a first aspect of the invention.

FIG. 1 shows a diagram of a tunable dispersion compensator ("TDC") 10 with minimum DGD, according to a first aspect of the invention. The TDC 10 includes an input fiber 12 that receives an optical data signal. Input fiber 12 is connected to the first port of a circulator 14, or other suitable coupling device. Circulator 14 is an optical device with three numbered ports. Inputs received at the circulator's first port are transmitted to the circulator's second port, where they are provided as an output to an optical device connected to the second port. Similarly, inputs received at the second port are transmitted to, and provided as an output at, the circulator's third port.

As shown in FIG. 1, there is connected to the second port of circulator 14 a subsystem 16 including a pathway 18 to a tunable CFBG 20. Coupled into the pathway 18 is a DGD element 22.

The data signal enters the optical subsystem 16 through the circulator port, passes through the DGD element 22, and then enters the tunable CFBG 20. The CFBG 20 includes a number of wavelength-sensitive reflector regions that function as a dispersion compensator. The dispersion-compensated signal is reflected back through the DGD element 22 and back into the circulator 14. The circulator 14 then transmits the dispersion-compensated signal to its third port, from which the signal is fed into an output fiber 24.

As discussed above, the tunable CFBG 20 introduces a dispersion-dependent amount of DGD into the data signal. The DGD element 22 introduces an amount of oppositely signed DGD into the data signal that compensates for the DGD introduced by the CFBG 20. It will be seen from FIG. 1 that the optical data signal passes through the DGD element 22 twice. Thus, to compensate for a certain amount X of DGD introduced by the CFBG in its untuned state, the DGD element introduces $-X/2$ of DGD, i.e., one-half of the DGD introduced by the CFBG, oppositely signed.

In order to simplify the present discussion, whenever there is a reference to the DGD introduced by the DGD element, it will be understood that reference is being made to the total DGD introduced by the DGD element into the pathway to the CFBG, i.e., the sum of the DGD in both directions.

As mentioned above, the DGD element 22 may suitably be implemented using a segment of polarization-maintaining fiber (PMF) Such Fiber has a high birefringence, and a segment of PMF yield a particular DGD in transmission, as a function of the length of the segment. Thus, a desired amount of oppositely signed DGD may be obtained by selecting a suitable length of the DGD element. It should be noted that the DGD element may be implemented using other types of optical devices or combinations of devices, including a birefringent crystal, or the like. Alternatively, the DGD element may be tunable between a minimum and maximum value of DGD.

As mentioned above, it is known to use a fixed DGD element to compensate for DGD introduced by a static (i.e., non-tunable) CFBG. However, with a tunable CFBG, the amount of DGD varies with the tuned dispersion. Given that the DGD element 22 introduces a fixed amount of DGD into the transmission line, and given that the tunable CFBG introduces a variable amount of DGD into the transmission line, it will be apparent that the DGD element can eliminate DGD in the data signal at best at only one setting in the CFBG's operating range, and that some DGD will be present at other settings in the CFBG's operating range.

The issues to be addressed, then, are (1) how to choose a value for the total amount of oppositely signed DGD to be introduced by the Fixed DGD element that minimizes total DGD over the entire operating range of the CFBG, and (2) how to quantify the maximum amount of total DGD, after total DGD has been thus minimized.

Figure 2:
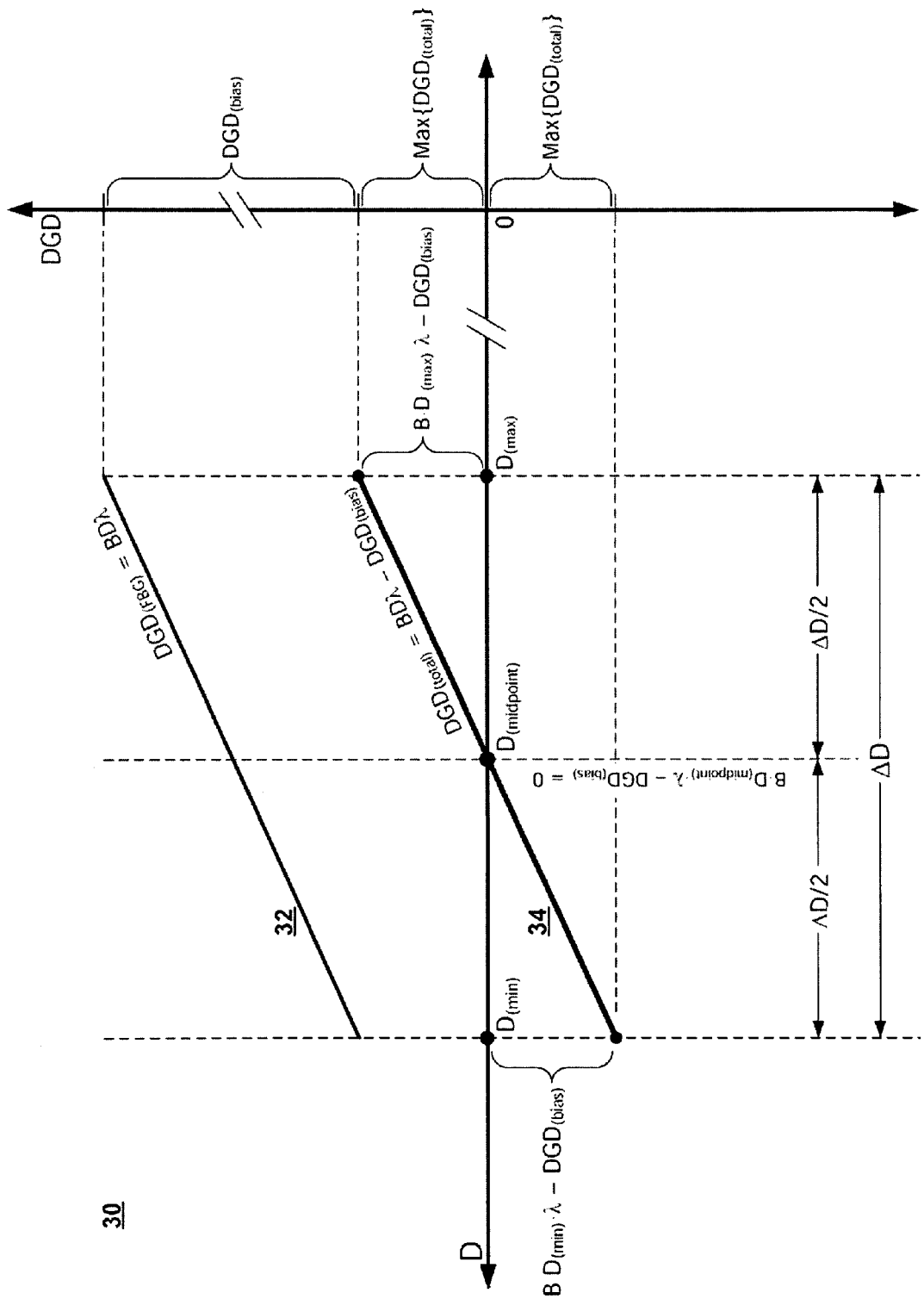
FIG. 2 is a graph illustrating a technique according to the present invention for minimizing DGD in the tunable dispersion compensator shown in FIG. 1.

FIG. 2 shows a graph 30, not drawn to scale, illustrating an approach to minimizing DGD according to an aspect of the present invention. As mentioned above, within its operating range, a tunable CFBG exhibits first-order PMD, according to Equation (1), reproduced here for convenience:

$$DGD = BD\lambda \quad (1)$$

where B is the CFBG birefringence, D is the tuned dispersion, and $\lambda$ is the signal wavelength (e.g., 1550 nm).

$D_{(min)}$ and $D_{(max)}$ are defined to be, respectively, the lower and upper limits of the operating range of the CFBG, and $\Delta D$ is defined to be the interval between $D_{(min)}$ and $D_{(max)}$. Thus, $$D_{(max)} = D_{(min)} + \Delta D \quad (2)$$

$DGD_{(FBG)}$ is defined to be the amount of DGD introduced by the CFBG, and is depicted as the upper trace 32 in graph 30. Combining Equations (1) and (2) yields the following relationship:

$$DGD_{(FBG)} = BD\lambda \quad (3)$$

As discussed above, a DGD element, such as a PMF segment, introduces an oppositely signed DGD into the transmission line to compensate for $DGD_{(FBG)}$. The oppositely signed DGD is referred to herein as $DGD_{(bias)}$. The total, combined DGD of the CFBG and the DGD element is referred to herein as $DGD_{(total)}$, and can be expressed as follows:

$$DGD_{(total)} = DGD_{(FBG)} - DGD_{(bias)} \quad (4)$$

Combining Equations (1) and (4) yields $$DGD_{(total)} = BD\lambda - DGD_{(bias)} \quad (5)$$

As used herein, $D_{(midpoint)}$ is defined to be halfway between $D_{(min)}$ and $D_{(max)}$. Thus, $$D_{(min)} + \Delta D/2 = D_{(midpoint)} \quad (6)$$

and $$D_{(midpoint)} + \Delta D/2 = D_{(max)} \quad (7)$$

It will be seen in FIG. 2 that $DGD_{(total)}$ can be minimized across the CFBG operating range by selecting a DGD element introducing a $DGD_{(bias)}$ that is equal to the amount of $DGD_{(CFBG)}$ at when $D = D_{(midpoint)}$, or $$DGD_{(total)} = BD_{(midpoint)} \cdot \lambda - DGD_{(bias)} = 0 \quad (8)$$

or $$DGD_{(bias)} = B \cdot D_{(midpoint)} \cdot \lambda \quad (9)$$

Thus, $$DGD_{(total)} = BD\lambda - DGD_{(bias)} \quad (10)$$

In FIG. 2, the lower graphed line 34 shows $DGD_{(total)}$ where $DGD_{(bias)}$ is equal to $B \cdot D_{(midpoint)} \cdot \lambda$. As shown in FIG. 2, setting $DGD_{(bias)}$ in this way causes line 32 to shift downward, with the midpoint of the line 34 intersecting the x-axis.

It will be seen that $DGD_{(total)}$ is zero at $D_{(midpoint)}$ and increases as D moves away from $D_{(midpoint)}$ towards $D_{(min)}$ and towards $D_{(max)}$. It will further be seen that the absolute value of $DGD_{(total)}$ at $DGD_{(min)}$ and at $DGD_{(max)}$ are equal to each other.

Thus, as illustrated by FIG. 2, the maximum $DGD_{(total)}$ over the entire tuning range will be:

$$\text{Max}\{DGD_{(total)}\} = |B \cdot D_{(min)} \cdot \lambda - DGD_{(bias)}| = |B \cdot D_{(max)} \cdot \lambda - DGD_{(bias)}| \quad (11)$$

A further aspect of the invention provides a more general technique for providing tunable dispersion compensation with acceptably low DGD. As described above with respect to FIG. 1, the DGD element introduces into the subsystem pathway an offsetting differential group delay $DGD_{(bias)}$. In a general technique, $DGD_{(bias)}$ is selected to have an absolute value that, for at least one tuning value of the CFBG, is substantially equal to that of the DGD introduced by the CFBG At the tuning value, the total combined differential group delay $DGD_{(bias)}$ introduced by the grating and the DGD element is substantially equal to zero.

Figure 3:
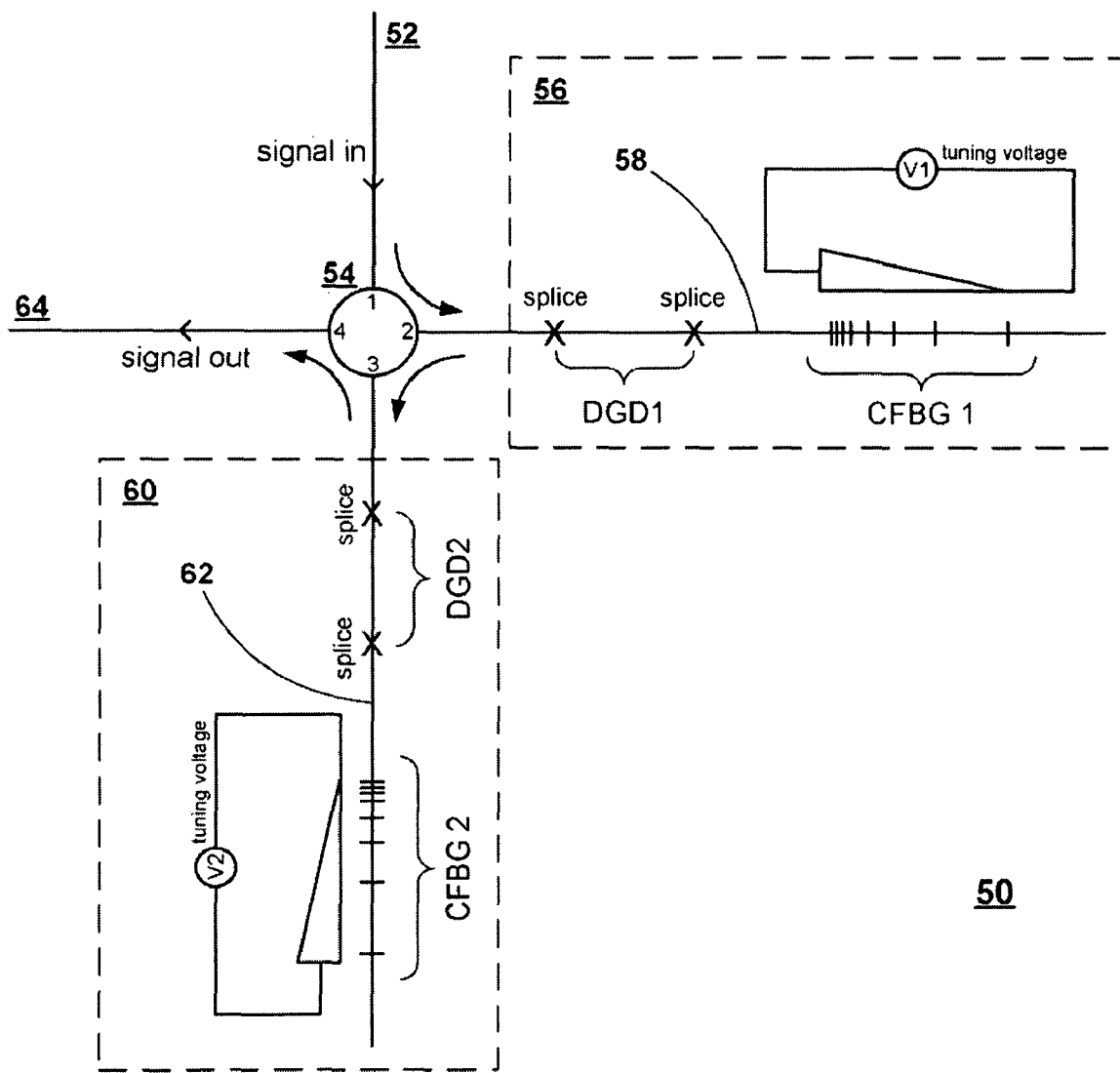
FIG. 3 is a diagram of a tunable dispersion compensator having a plurality of tunable gratings, according to a further aspect of the invention.

FIG. 3 shows a diagram of an exemplary dispersion compensator 50 with minimum DGD according to another aspect of the invention, in which dispersion compensation is provided by a pair of concatenated tunable gratings CFBG1 and CFBG2.

The dispersion compensator 50 includes an optical fiber input 52 carrying an optical data signal. The input fiber 52 is connected to the first port of a four-port circulator 54, or other suitable coupling device. A first subsystem 56, comprising a first pathway 58 into which is coupled a DGD element DGD1 and a first chirped fiber Bragg grating CFBG1, is connected to the second port of the circulator, and a second subsystem 60, comprising a second pathway 62 in which is coupled a second DGD element DGD2 and a second chirped fiber Bragg grating CFBG2. An output fiber 64 is connected to the circulator's fourth port.

The optical signal travels through the input fiber 52 into the circulator's first port and out of the circulator's second into the first subsystem 56 along pathway 58. In the first subsystem 56, the signal passes through DGD1 into CFBG1, which reflects the signal back through DGD1 and back into the second port of the circulator. The circulator 54 then transmits the signal to its third port from which it is fed into the second subsystem 60. In the second subsystem 60, the signal passes along pathway 62 through DGD2 into CFBG2, which reflects the signal back through DGD2 and back into the third port of the circulator, which transmits the signal to its fourth port, from which it is fed into the output fiber 64.

Subsystems 56 and 60 function in the same way as subsystem 16 in the FIG. 1 dispersion compensator 10, discussed above. Gratings CFBG1 and CFBG2 provide chromatic dispersion compensation Each of gratings CFBG1 and CFBG2 has a respective birefringence B1 and B2 and therefore introduces a dispersion-dependent amount of DGD:

$$DGD_{(FBG1)} = B1 \cdot D1 \cdot \lambda \quad (12)$$

and $$DGD_{(FBG2)} = B2 \cdot D2 \cdot \lambda \quad (13)$$

Elements DGD1 and DGD2 provide respective amounts of differential group delay $DGD1_{(bias)}$ and $DGD2_{(bias)}$ that are oppositely signed relative to the $DGD_{(FBG1)}$ and $DGD_{(FBG2)}$.

Figure 4:
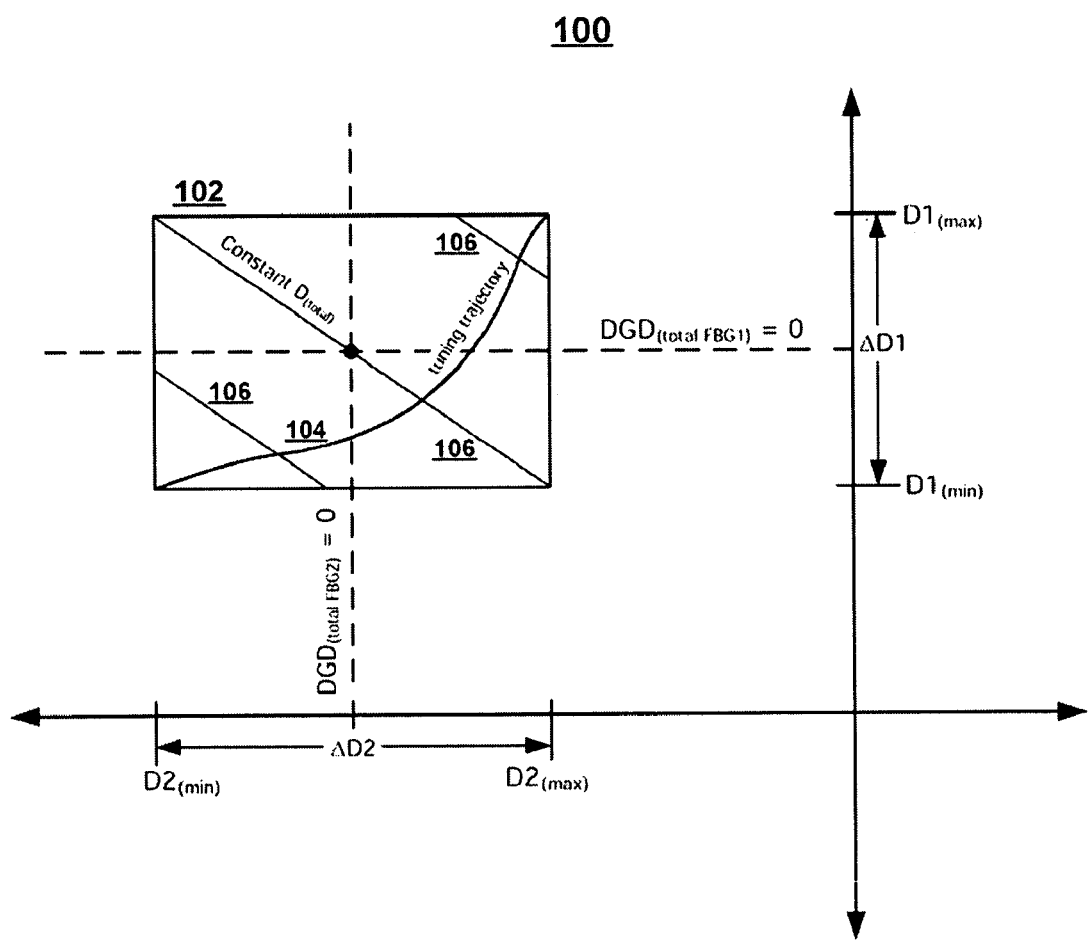
FIG. 4 is a graph illustrating a tuning space for the dispersion compensator shown in FIG. 3.

FIG. 4 is a graph 100 showing an exemplary tuning space 102 for gratings CFBG1 and CFBG2. In graph 100, the y-axis is used to indicate the dispersion D1 of grating CFBG 1 and the x-axis is used to indicate the dispersion D2 of grating CFBG2. As shown in graph 100, the operating range of CFBG1 extends from $D1_{(min)}$ to $D1_{(max)}$, and the operating range of CFBG2 extends from $D2_{(min)}$ to $D2_{(max)}$. The interval between $D1_{(max)}$ and $D1_{(min)}$ is $\Delta D1$, and the interval between $D2_{(max)}$ and $D2_{(min)}$ is $\Delta D2$.

As illustrated in FIG 4, in the case of two concatenated gratings, the tuning trajectory for minimum $DGD_{(total)}$ is no longer unique. Rectangular tuning region 102 includes every possible tuning point for gratings CFBG1 and CFBG2 tuned, respectively, between $D1_{(min)}$ and $D1_{(max)}$ and between $D2_{(min)}$ and $D2_{(max)}$. Line 104 shows an example of one possible tuning trajectory.

The diagonal lines 106 in the tuning region 102 represent different values of the total dispersion $D_{(total)}$, which is the sum of the respective dispersion of the two gratings:

$$D_{(total\ two\ gratings)} = D_{(FBG1)} + D_{(FBG2)} \quad (14)$$

The discussion with respect to the single-CFBG tunable dispersion compensator depicted in FIG. 1 also applies to each individual subsystem 56, 58 in the dual-CFBG tunable dispersion compensator shown in FIG. 3.

Assuming that nothing is known about a particular tuning trajectory, other than that it is contained within the rectangular tuning space 102, it is possible to minimize $DGD_{(total)}$ and to quantify $\text{Max}\{DGD_{(total)}\}$. The maximum DGD for any bias point for the sum of both gratings will be:

$$\text{Max}\{DGD_{(total\ two\ gratings)}\} = \text{Max}\{DGD_{(total\ FBG1)}\} + \text{Max}\{DGD_{(total\ FBG2)}\} \quad (15)$$

The dashed lines represent chromatic dispersion values for which $DGD_{(total)}$ is zero for that CFBG. Applying the earlier discussion to subsystems 56 and 58, it will be seen that $DGD_{(total\ two\ gratings)}$ is minimized if each of gratings CFBG1 and CFBG2 are biased such that the midpoints $D1_{(midpoint)}$ and $D2_{(midpoint)}$ of their respective operating ranges have zero total DGD.

Figure 5:
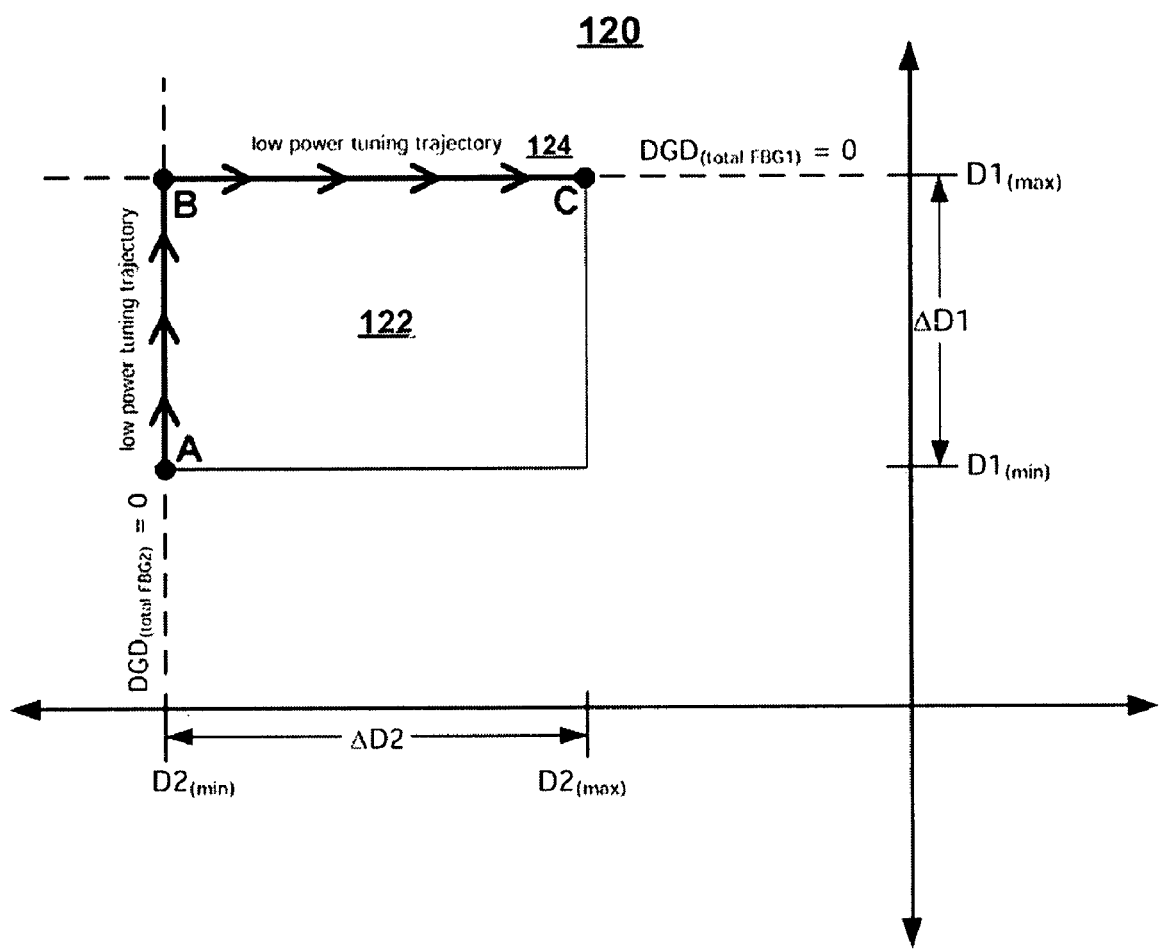
FIG. 5 is a graph illustrating a low-power tuning trajectory used in conjunction with a further aspect of the invention.

While this method is advantageous since it allows any trajectory, it is not the only possibility. FIG. 5 is a graph 120 in which tuning space 122 is traversed by a tuning trajectory 124 according to which a thermal TDC is commonly operated in order to achieve low power consumption. The trajectory 124 starts at point ($D2_{(min)}$, $D1_{(min)}$, referred to hereinafter as "point A." Then, D1 is ramped up from $D1_{(min)}$ to $D1_{(max)}$, while D2 remains at $D2_{(min)}$. Starting at point ($D2_{(min)}$, $D1_{(max)}$), referred to hereinafter as "point B," D1 is held at $D_{(max)}$, and D2 is now ramped up from $D2_{(min)}$ to $D2_{(max)}$. The tuning trajectory terminates at point ($D2_{(max)}$, $D1_{(max)}$), referred to hereinafter as "point C."

In this case, it is not necessary to bias at the midpoints. In fact, if the $DGD_{(bias)}$ is set so that $DGD_{(total\ FBG1)}=0$ or $D1_{(max)}$, and $DGD_{(total\ FBG2)}=0$ for $D2_{(min)}$. In that case, it will be seen that $$\text{Max}\{DGD_{(FBG1)}\} = |B1 \cdot \Delta D1 \cdot \lambda| \tag{16}$$

and $$\text{Max}\{DGD_{(FBG2)}\} = |B2 \cdot \Delta D2 \cdot \lambda| \tag{17}$$

At point A, the DGD contributed by grating CFGB2 starts at 0, and the DGD contributed by grating CFBG1 starts at $B1 \cdot \Delta D1 \cdot \lambda$. As the tuning trajectory proceeds upward from point A to point B, the DGD contributed by grating CFGB2 remains at 0, while the DGD contributed by grating CFBG1 decreases to 0. Thus, at point B, the total amount of DGD contributed by both gratings is 0.

As the tuning trajectory proceeds left to right from point B to point C, the amount of DGD contributed by CFBG1 remains at 0, while the DGD contributed by CFBG2 increases to its maximum value. At point C, the total amount of DGD contributed by both gratings is $B2 \cdot \Delta D2 \cdot \lambda$.

This relationship can be expressed as follows:

$$\text{Max}\{DGD_{(total\ two\ gratings)}\} = \text{Max}\{|B1 \cdot \Delta D1 \cdot \lambda|\ \text{or}\ |B2 \cdot \Delta D2 \cdot \lambda|\} \tag{18}$$

In general, if the two gratings are matched such that $\Delta D1 = \Delta D2$ and $B1 = B2$, then $\text{Max}\{DGD\}$ is the same in either case:

$$\text{Max}\{DGD_{(total\ two\ gratings)}\} = |B1 \cdot \Delta D1 \cdot \lambda| \tag{19}$$

Thus, total DGD can be minimized in a dual-CFBG tunable dispersion compensator with this particular tuning trajectory by tuning CFBG1 to its maximum dispersion value and CFBG2 is tuned to its minimum dispersion value. Each grating is provided with a respective DGD element that compensates for the respective amount of DGD produced by each tuned grating. More generally, for any tuning trajectory that minimizes power consumption, by for instance tuning only one grating at a time, the total DGD should be minimized for a given grating in the tuning state where its power consumption is also minimized. Ideally, total DGD and power consumption should both be zero at the same time. The total DGD will then increase only as the power consumption increases while the other grating or gratings are tuned.

The above-described techniques may require active monitoring of the DGD to assure that it is zero at the correct bias point. It is also desirable to be able to minimize the DGD without active monitoring.

According to a further aspect of the invention, it is possible to come reasonably close to the above theoretical minima of $DGD_{(max\ total)}$ even if $DGD_{(bias)}$ or $B \cdot D_{(midpoint)} \cdot \lambda$ are not known to high accuracy and are not measured.

The following relationship must be satisfied in the upper lefthand quadrant of the tuning region:

$$DGD_{(total)} = B \cdot D_{(unknown)} \cdot \lambda - DGD_{(unknown)} = 0 \tag{20}$$

That is, the following must be true:

$$(D1_{(min)} + \Delta D1/2) \leq D1_{(unknown)} \leq D1_{(max)} \tag{21}$$

and $$D2_{(min)} \leq D2_{(unknown)} \leq (D2_{(max)} - \Delta D2/2) \tag{22}$$

Thus, even if $B \cdot D \cdot \lambda$ and $DGD_{(bias)}$ are not precisely known, it is nonetheless possible to significantly reduce DGD by ensuring that $DGD_{(total\ FBG1)}$ is zero at some point within the upper half of its operating range and that $DGD_{(total\ FBG2)}$ is zero at some point within the lower half of its operating range. In that case, the maximum total DGD for the two gratings CFBG1 and CFBG2 is:

$$\text{Max}\{DGD_{(total\ two\ gratings)}\} = \text{Max}\{(|B1 \cdot \Delta D1 \cdot \lambda| + |B2 \cdot \Delta D2 \cdot \lambda/2|)\ \text{or}\ (|B2 \cdot \Delta D2 \cdot \lambda| + |B1 \cdot \Delta D1 \cdot \lambda/2|)\} \tag{23}$$

FIG. 5 is only one example of a tuning space. In general, reducing the DGD for other tuning spaces will require the following: The DGD should be less than half of its maximum value when a given tuning voltage is held fixed and another tuning voltage is adjusted. As a particular case, consider again the case of tuning trajectories that minimize power consumption. When a given tuning voltage (V1 or V2 in FIG. 3) is held fixed at a lower power consumption state, the DGD element should be chosen so that the total DGD of grating plus DGD element is less than half of its maximum value during tuning.

Further, if either of $DGD_{(bias)}$ or $BD_{(midpoint)} \cdot \lambda$ are not known for a given combination of concatenated tunable CFBGs plus DGD elements, then it is possible to minimize DGD by finding a tuning trajectory than minimizes the maximum $DGD_{(total)}$ along its entire route. Thus, the device may be tuned on this curve to obtain a minimum upper bound on $DGD_{(total)}$.

It should be noted that the techniques described above with respect to FIGS. 3-5 may be expanded for application to a dispersion compensator comprising three or more CFBGs. In that case, the tuning spaces shown in FIGS. 4 and 5 would have additional dimensions, corresponding to the added CFBGs.

It should be noted that it is necessary for the gratings to be properly aligned with respect to the DGD elements. This alignment is achieved by actively monitoring DGD while rotating the fibers before splicing. Alternatively, it can be achieved by marking the CFBG during writing so that the birefringence axes induced by the write process and aligned to it are known. It would also be possible to use a PMF, the axes of which can also be easily observed, such as a TruePhase fiber, available from OFS.

Figure 6:
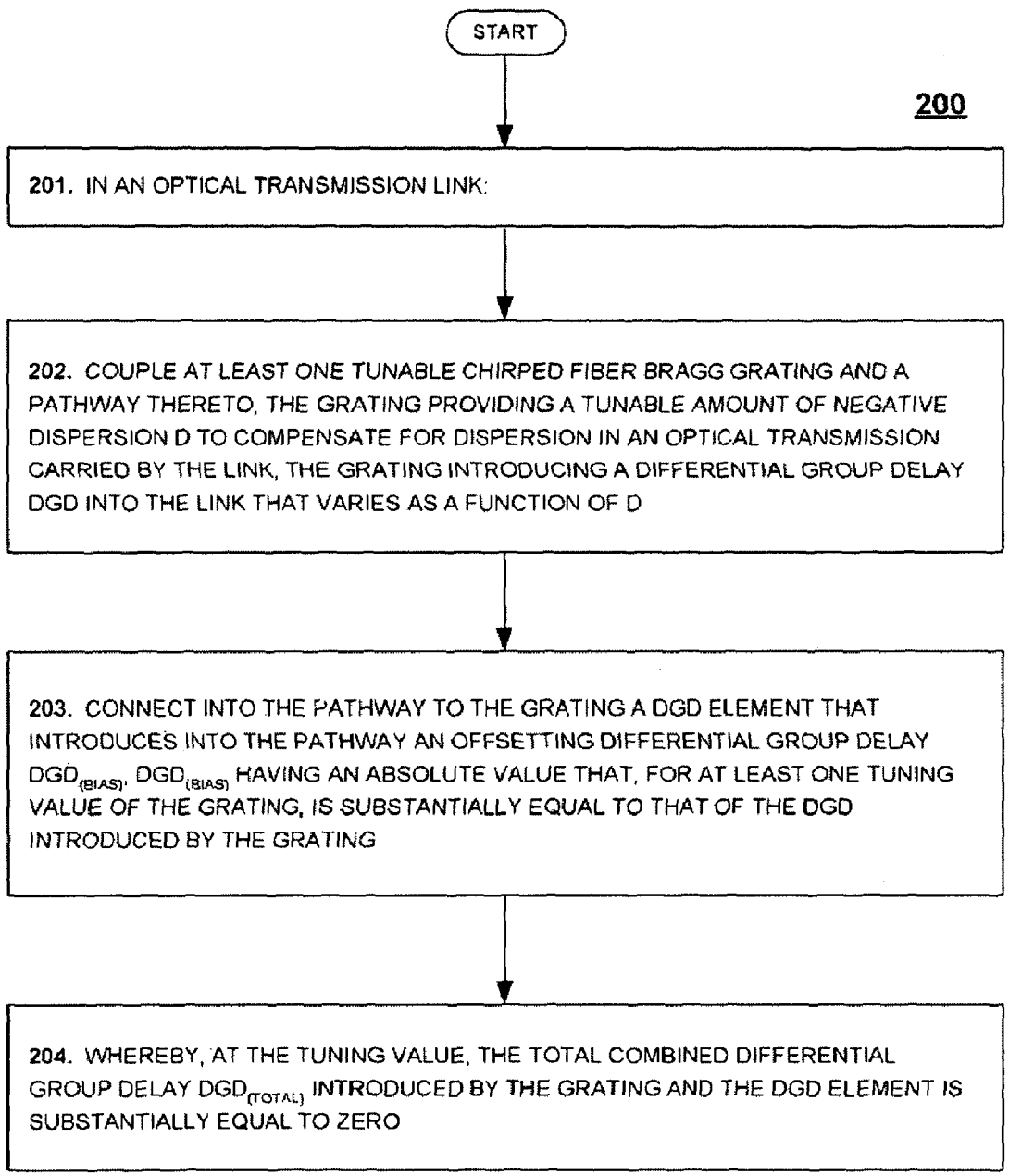
FIGS. 6-8 are a series of flowcharts illustrating general techniques according to described aspects of the invention.
Figure 7:
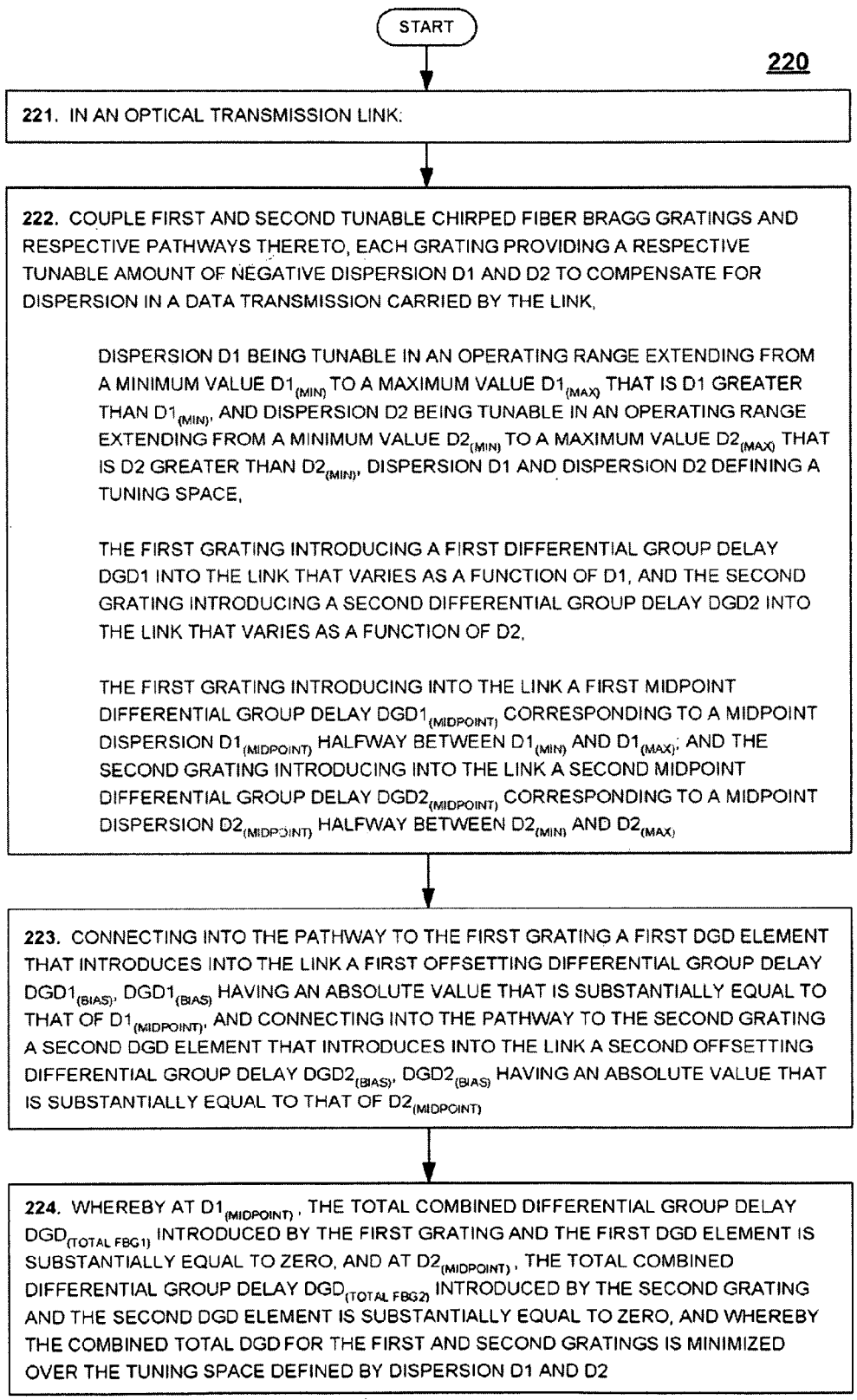
Figure 8:
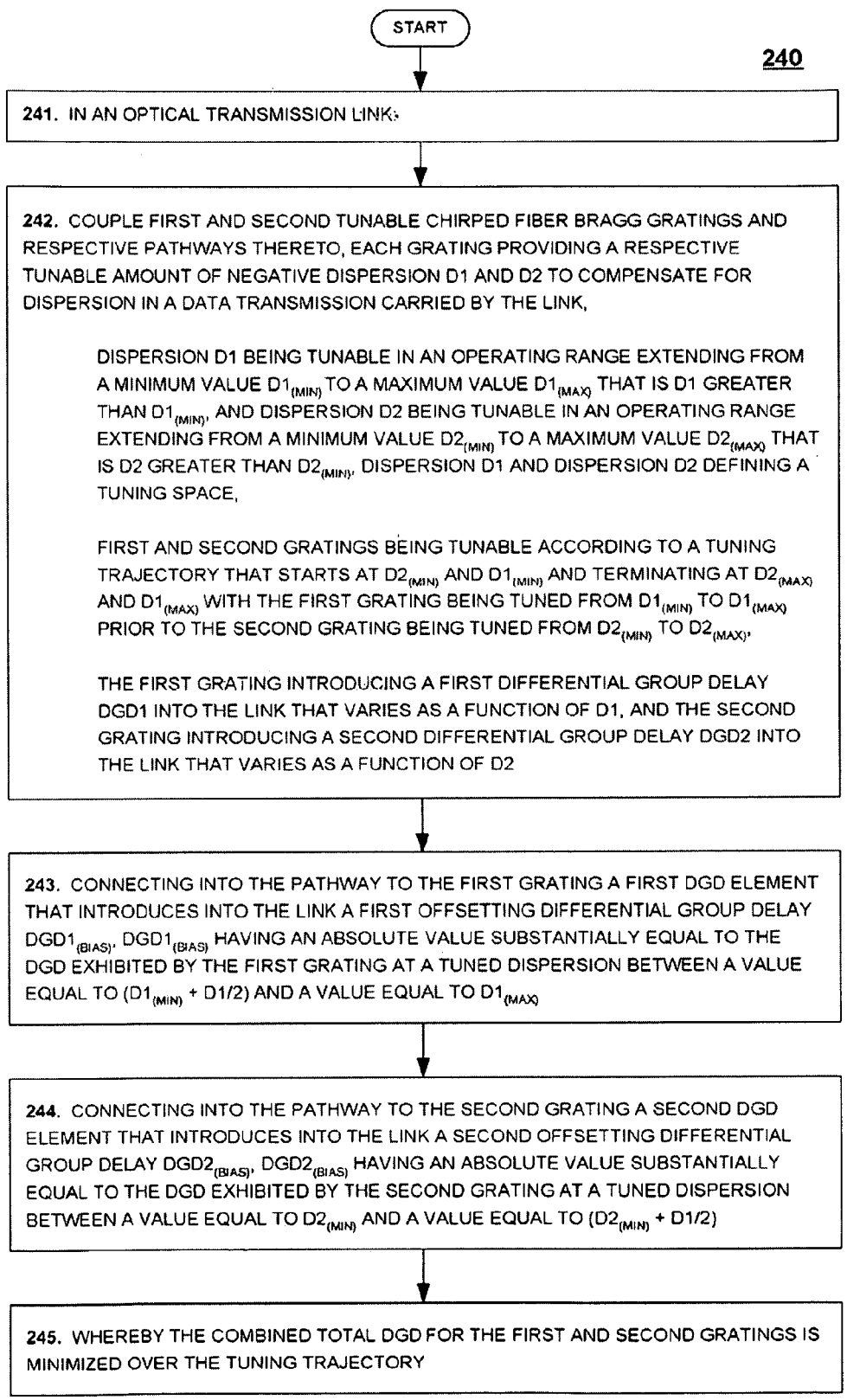

FIGS. 6-8 are a series of flowcharts of examples of techniques in accordance with the above-described aspects of the invention. It will be appreciated that the depicted techniques and elements thereof are illustrative, and that the invention as described herein may be practiced using techniques comprising modifications of these elements, or combinations thereof.

FIG. 6 is a flowchart illustrating a technique 200, including the following:

Box 201: In an optical transmission link:

Box 202: There is coupled at least one tunable chirped fiber Bragg grating and a pathway thereto, the grating providing a tunable amount of dispersion D to compensate for dispersion in an optical transmission carried by the link, the grating introducing a differential group delay DGD into the link that varies as a function of D.

Box 203: There is connected into the pathway to the grating a DGD element that introduces into the pathway an offsetting differential group delay $DGD_{(bias)}$, $DGD_{(bias)}$ having an absolute value that, for at least one tuning value of the grating, is substantially equal to that of the DGD introduced by the grating.

Box 204: Whereby, at the tuning value, the total combined differential group delay $DGD_{(total)}$ introduced by the grating and the DGD element is substantially equal to zero.

As discussed above, the FIG. 6 technique 200 may be modified by including a number of additional elements.

In one modified technique, the grating is tunable in an operating range extending from a minimum value $D_{(min)}$ to a maximum value $D_{(max)}$ that is $\Delta D$ greater than $D_{(min)}$, wherein the grating introduces into the transmission link a midpoint differential group delay $DGD_{(midpoint)}$ corresponding to a midpoint dispersion $D_{(midpoint)}$ halfway between $D_{(min)}$ and $D_{(max)}$; and wherein the differential group delay $DGD_{(bias)}$ introduced into the grating pathway by the DGD element has an absolute value substantially equal to that of $DGD_{(midpoint)}$, whereby at $D_{(midpoint)}$ the total combined differential group delay $DGD_{(total)}$ introduced by the grating and the DGD element is substantially equal to zero, and whereby $DGD_{(total)}$ is minimized over the entire operating range of the grating.

Further modified techniques may include some or all of the following: using a circulator to couple into the link the grating, DGD element, and the pathway thereto; using a segment of polarization-maintaining fiber for the DGD element; using a tunable DGD element; and using a birefringent crystal for the DGD element.

FIG. 7 is a flowchart illustrating a technique 220, including the following:

Box 221: In an optical link:

Box 222: There are coupled first and second tunable chirped fiber Bragg gratings and respective pathways thereto, each grating providing a respective tunable amount of dispersion D1 and D2 to compensate for dispersion in a data transmission carried by the link, dispersion D1 being tunable in an operating range extending from a minimum value $D1_{(min)}$ to a maximum value $D1_{(max)}$ that is $\Delta D1$ greater than $D1_{(min)}$, and dispersion D2 being tunable in an operating range extending from a minimum value $D2_{(min)}$ to a maximum value $D2_{(max)}$ that is $\Delta D2$ greater than $D2_{(min)}$, dispersion D1 and dispersion D2 defining a tuning space, the first grating introducing a first differential group delay DGD1 into the link that varies as a function of D1, and the second grating introducing a second differential group delay DGD2 into the link that varies as a function of D2, the first grating introducing into the link a first midpoint differential group delay $DGD1_{(midpoint)}$ corresponding to a midpoint dispersion $D1_{(midpoint)}$ halfway between $D1_{(min)}$ and $D1_{(max)}$; and the second grating introducing into the link a second midpoint differential group delay $DGD2_{(midpoint)}$ corresponding to a midpoint dispersion $D2_{(midpoint)}$ halfway between $D2_{(min)}$ and $D2_{(max)}$;

Box 223: There is connected into the pathway to the first grating a first DGD element that introduces into the link a first offsetting differential group delay $DGD1_{(bias)}$, $DGD1_{(bias)}$ having an absolute value that is substantially equal to that of $D1_{(midpoint)}$, and there is connected into pathway to the second grating a second DGD element that introduces into the link a second offsetting differential group delay $DGD2_{(bias)}$, $DGD2_{(bias)}$ having an absolute value that is substantially equal to that of $D2_{(midpoint)}$.

Box 224: Whereby at $D1_{(midpoint)}$ the total combined differential group delay $DGD_{(total\ FBG1)}$ introduced by the first grating and the first DGD element is substantially equal to zero, and at $D2_{(midpoint)}$ the total combined differential group delay $DGD_{(total\ FBG2)}$ introduced by the second grating and the second DGD element is substantially equal to zero, and whereby the combined total DGD for the first and second gratings is minimized over the tuning space defined by dispersion D1 and D2.

As discussed above, the FIG. 7 technique 220 may be modified by including some or all of the following: using a circulator to couple into the link the first and second gratings, DGD elements, and respective pathways thereto; using first and second segments of polarization-maintaining fiber for the first and second DGD elements; using first and second birefringent crystals for the first and second DGD elements; and using first and second gratings having equal values for birefringence and for $\Delta D$.

FIG. 8 is a flowchart illustrating a technique 240, including the following:

Box 241: In an optical transmission link:

Box 242: There are coupled first and second tunable chirped fiber Bragg gratings and respective pathways thereto, each grating providing a respective tunable amount of dispersion D1 and D2 to compensate for dispersion in a data transmission carried by the link, dispersion D1 being tunable in an operating range extending from a minimum value $D1_{(min)}$ to a maximum value $D1_{(max)}$ that is $\Delta D1$ greater than $D1_{(min)}$, and dispersion D2 being tunable in an operating range extending from a minimum value $D2_{(min)}$ to a maximum value $D2_{(max)}$ that is $\Delta D2$ greater than $D2_{(min)}$, dispersion D1 and dispersion D2 defining a tuning space, first and second gratings being tunable according to a tuning trajectory that starts at $D2_{(min)}$ and $D1_{(min)}$ and terminating at $D2_{(max)}$ and $D1_{(max)}$ with the first grating being tuned from $D1_{(min)}$ to $D1_{(max)}$ prior to the second grating being tuned from $D2_{(min)}$ to $D2_{(max)}$, the first grating introducing a first differential group delay DGD1 into the link that varies as a function of D1, and the second grating introducing a second differential group delay DGD2 into the link that varies as a function of D2.

Box 243: There is connected into the pathway to the first grating a first DGD element that introduces into the link a first offsetting differential group delay $DGD1_{(bias)}$, $DGD1_{(bias)}$ having an absolute value substantially equal to the DGD exhibited by the first grating at a tuned dispersion between a value equal to $(D1_{(min)}+\Delta D1/2)$ and a value equal to $D1_{(max)}$.

Box 244: There is connected into the pathway to the second grating a second DGD element that introduces into the link a second offsetting differential group delay $DGD2_{(bias)}$, $DGD2_{(bias)}$ having an absolute value substantially equal to the DGD exhibited by the second grating at a tuned dispersion between a value equal to $D2_{(min)}$ and a value equal to $(D2_{(min)}+\Delta D1/2)$.

Box 245: Whereby the combined total DGD for the first and second gratings is minimized over the tuning trajectory.

As discussed above, the FIG. 8 technique 240 may be modified by including one or more of the following: selecting $DGD1_{(bias)}$ to be substantially equal to the DGD produced by the first grating at dispersion $D_{(max)}$ and selecting $DGD2_{(bias)}$ to be substantially equal to the DGD produced by the second grating a dispersion $D_{(min)}$; using a circulator to couple into the link the first and second gratings, DGD elements, and respective pathways thereto; using first and second segments of polarization-maintaining fiber for the first and second DGD elements; using first and second birefringent crystals for the first and second DGD elements; and using first and second gratings having equal values for birefringence and for $\Delta D$.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method for providing tunable dispersion compensation in an optical system, comprising:

using a coupling device to couple into the system first and second pathways into which are connected respective first and second tunable chirped fiber Bragg gratings, each grating providing a respective tunable amount of compensatory chromatic dispersion D1 and D2, dispersion D1 being tunable in an operating range extending from a minimum value $D1_{(min)}$ to a maximum value $D1_{(max)}$ that is $\Delta D1$ greater than $D1_{(min)}$, and dispersion D2 being tunable in an operating range extending from a minimum value $D2_{(min)}$ to a maximum value $D2_{(max)}$ that is $\Delta D2$ greater than $D2_{(min)}$, dispersion D1 and dispersion D2 defining a tuning space, the first grating introducing a first differential group delay DGD1 into the system that varies as a function of D1, and the second grating introducing a second differential group delay DGD2 into the system that varies as a function of D2, the first grating introducing into the system a first midpoint differential group delay $DGD1_{(midpoint)}$ corresponding to a midpoint dispersion $D1_{(midpoint)}$ halfway between $D1_{(min)}$ and $D1_{(max)}$; and the second grating introducing into the system a second midpoint differential group delay $DGD2_{(midpoint)}$ corresponding to a midpoint dispersion $D2_{(midpoint)}$ halfway between $D2_{(min)}$ and $D2_{(max)}$;

connecting into the first pathway a first set of PMD-compensating DGD elements, comprising at least one fixed PMD-compensating DGD element, the first set of PMD-compensating DGD elements introducing into the system a first bias differential group delay $DGD1_{(bias)}$, $DGD1_{(bias)}$ having an absolute value that is substantially equal to that of $D1_{(midpoint)}$, and connecting into the second pathway a second set of PMD-compensating DGD elements, comprising at least one fixed PMD-compensating DGD element, the second set of all such elements introducing into the system a second bias differential group delay $DGD2_{(bias)}$, $DGD2_{(bias)}$ having an absolute value that is substantially equal to that of $D2_{(midpoint)}$, whereby at $D1_{(midpoint)}$ the total combined differential group delay $DGD_{(total\ FBG1)}$ introduced by the first grating and the first set of PMD-compensating DGD elements is substantially equal to zero, and at $D2_{(midpoint)}$ the total combined differential group delay $DGD_{(total\ FBG2)}$ introduced by the second grating and the second set of PMD-compensating DGD elements is substantially equal to zero, and whereby the combined total DGD for the first and second gratings is minimized over the tuning space defined by compensatory chromatic dispersions D1 and D2.

2. The method of claim 1, wherein the coupling device comprises a circulator.

3. The method of claim 1, further including:

using first and second segments of polarization-maintaining fiber for at least one of the fixed PMD-compensating DGD elements in the first and second sets of PMD-compensating DGD elements.

4. The method of claim 1, further including:

using first and second birefringent crystals for at least one of the fixed PMD-compensating DGD elements in the first and second set of PMD-compensating DGD elements.

5. The method of claim 1, further including:

using first and second gratings having equal values for birefringence and for $\Delta D$.

6. The method of claim 1, wherein at least one of the PMD-compensating DGD elements in the first and second set of PMD-compensating DGD elements is tunable.

7. A method for providing tunable dispersion compensation in an optical system, comprising:

using a coupling device to couple into the system first and second pathways into which are connected respective first and second tunable chirped fiber Bragg gratings, each grating providing a respective tunable amount of compensatory chromatic dispersion D1 and D2 to compensate for chromatic dispersion in a data transmission carried by the system, dispersion D1 being tunable in an operating range extending from a minimum value $D1_{(min)}$ to a maximum value $D1_{(max)}$ that is $\Delta D1$ greater than $D1_{(min)}$, and dispersion D2 being tunable in an operating range extending from a minimum value $D2_{(min)}$ to a maximum value $D2_{(max)}$ that is $\Delta D2$ greater than $D2_{(min)}$, dispersion D1 and dispersion D2 defining a tuning space, first and second gratings being tunable according to a tuning trajectory that starts at $D2_{(min)}$ and $D1_{(min)}$ and terminating at $D2_{(max)}$ and $D1_{(max)}$ with the first grating being tuned from $D1_{(min)}$ to $D1_{(max)}$ prior to the second grating being tuned from $D2_{(min)}$ to $D2_{(max)}$, the first grating introducing a first differential group delay DGD1 into the system that varies as a function of D1, and the second grating introducing a second differential group delay DGD2 into the system that varies as a function of D2;

connecting,into the first pathway a first set of PMD-compensating DGD elements, comprising at least one fixed PMD-compensating DGD element, that introduces into the system a first offsetting differential group delay $DGD1_{(bias)}$, $DGD1_{(bias)}$ having an absolute value substantially equal to the DGD exhibited by the first grating at a tuned dispersion between a value equal to $(D1_{(min)}+\Delta D1/2)$ and a value equal to $D1_{(max)}$;

connecting into the second pathway a second set of PMD-compensating DGD elements, comprising at least one fixed PMD-compensating DGD element, that introduces into the system a second offsetting differential group delay $DGD2_{(bias)}$, $DGD2_{(bias)}$ having an absolute value substantially equal to the DGD exhibited by the second grating at a tuned dispersion between a value equal to $D2_{(min)}$ and a value equal to $(D2_{(min)}+\Delta D1/2)$, whereby the combined total DGD for the first and second gratings is minimized over the tuning trajectory.

8. The method of claim 7, wherein $DGD1_{(bias)}$ is substantially equal to DGD1 produced by the first grating at dispersion $D1_{(max)}$, and wherein $DGD2_{(bias)}$ is substantially equal to DGD2 produced by the second grating at dispersion $D2_{(min)}$.

9. The method of claim 7, wherein the coupling device comprises a circulator.

10. The method of claim 7, further including:
using first and second segments of polarization-maintaining fiber for at least one of the fixed PMD-compensating DGD elements in the first and second sets of PMD-compensating DGD elements.

11. The method of claim 7, further including:
using first and second birefringent crystals for at least one of the fixed PMD-compensating DGD elements in the first and second sets of PMD-compensating DGD elements.

12. The method of claim 7, further including:
using first and second gratings having equal values for birefringence and for $\Delta D$.

* * * * *